Figure 1:
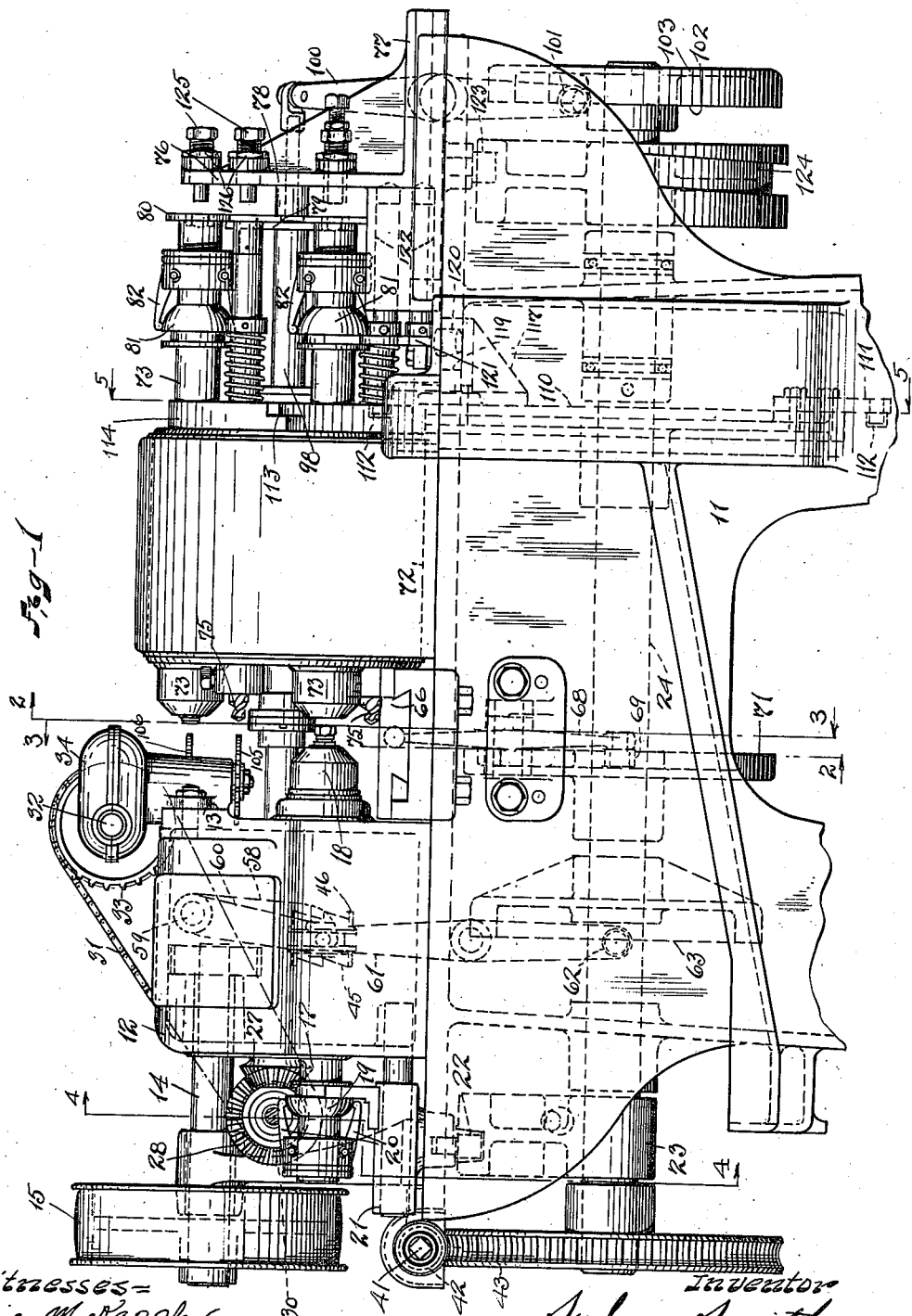

S. SMITH.
MACHINE FOR MAKING CASTELLATED NUTS.
APPLICATION FILED MAY 7, 1914.

1,216,742.

Patented Feb. 20, 1917.
9 SHEETS—SHEET 1.

S. SMITH.
MACHINE FOR MAKING CASTELLATED NUTS.
APPLICATION FILED MAY 7, 1914.

1,216,742.

Patented Feb. 20, 1917.
9 SHEETS—SHEET 4.

S. SMITH.
MACHINE FOR MAKING CASTELLATED NUTS.
APPLICATION FILED MAY 7, 1914.
1,216,742.
Patented Feb. 20, 1917.
9 SHEETS—SHEET 5.
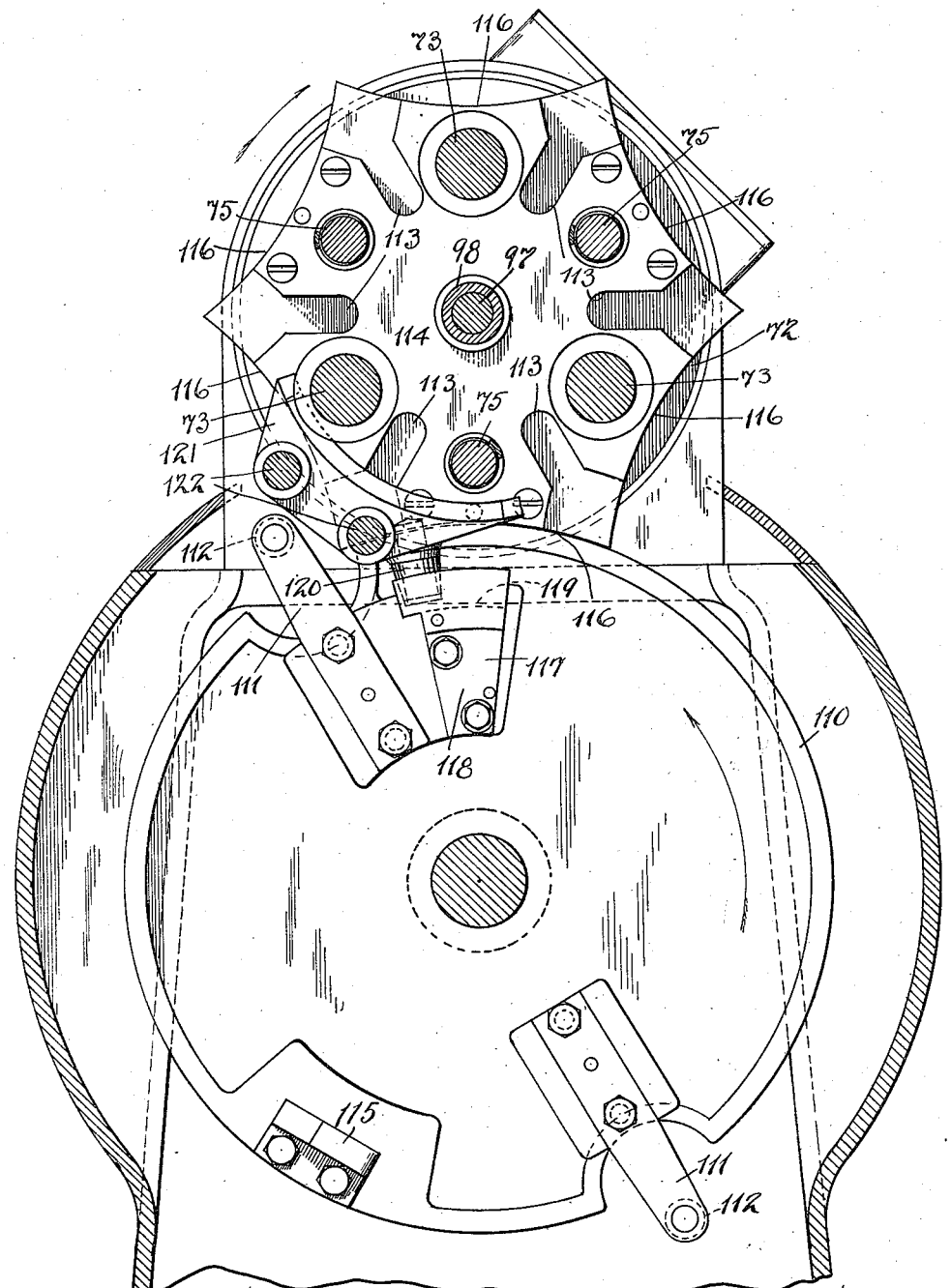

S. SMITH.
MACHINE FOR MAKING CASTELLATED NUTS.
APPLICATION FILED MAY 7, 1914.
1,216,742.
Patented Feb. 20, 1917.
9 SHEETS—SHEET 6.
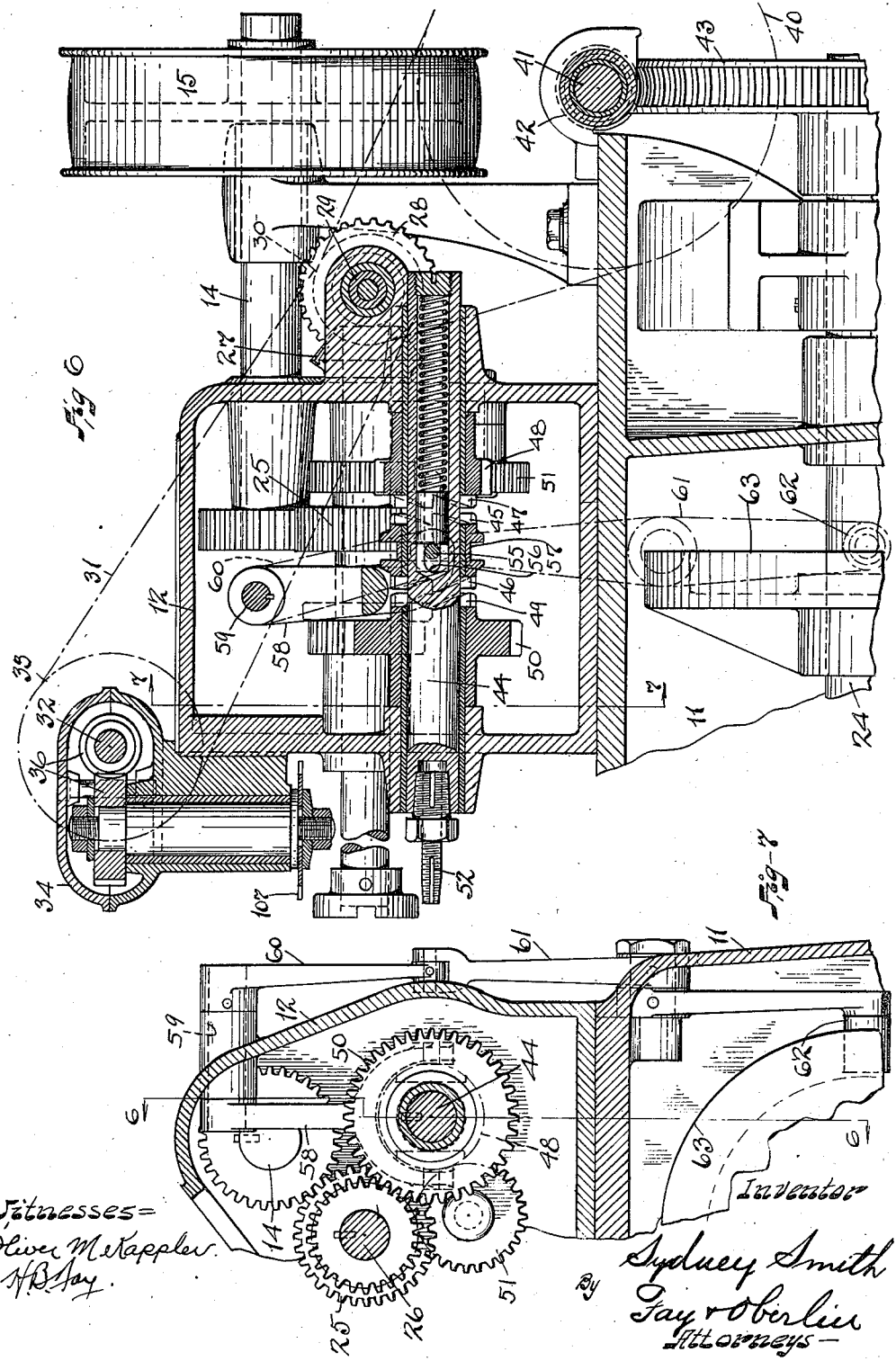

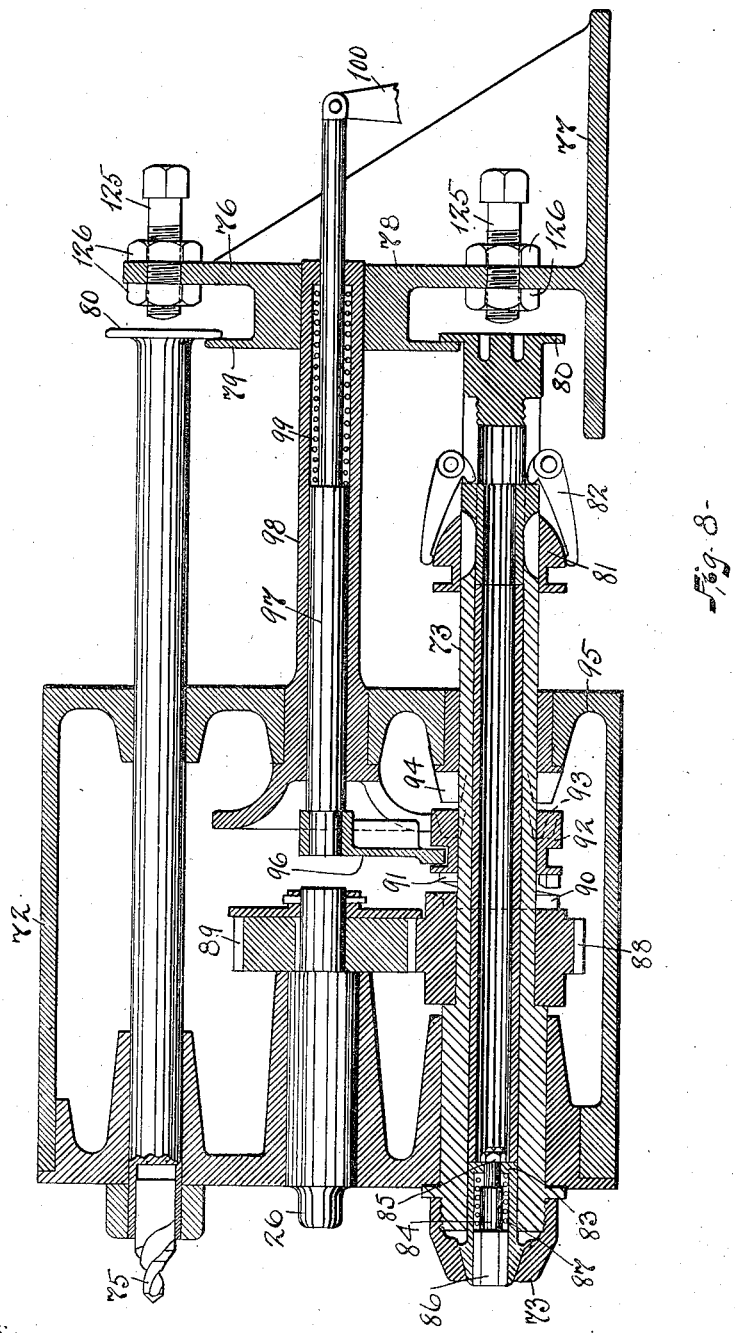

S. SMITH.
MACHINE FOR MAKING CASTELLATED NUTS.
APPLICATION FILED MAY 7, 1914.
1,216,742.
Patented Feb. 20, 1917.
9 SHEETS—SHEET 8.
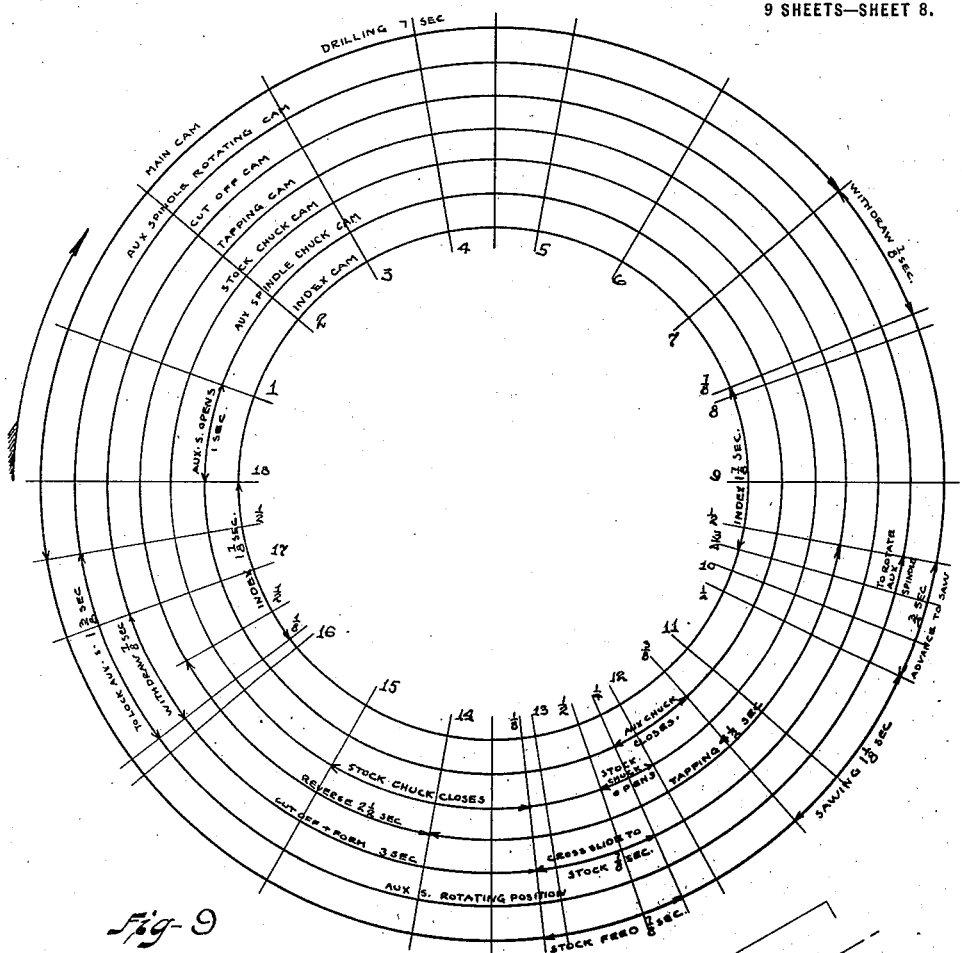
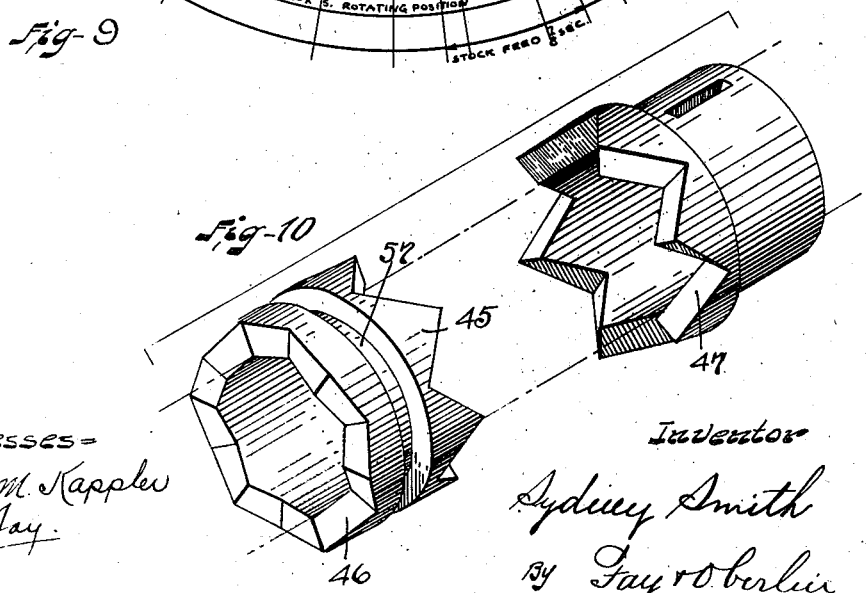

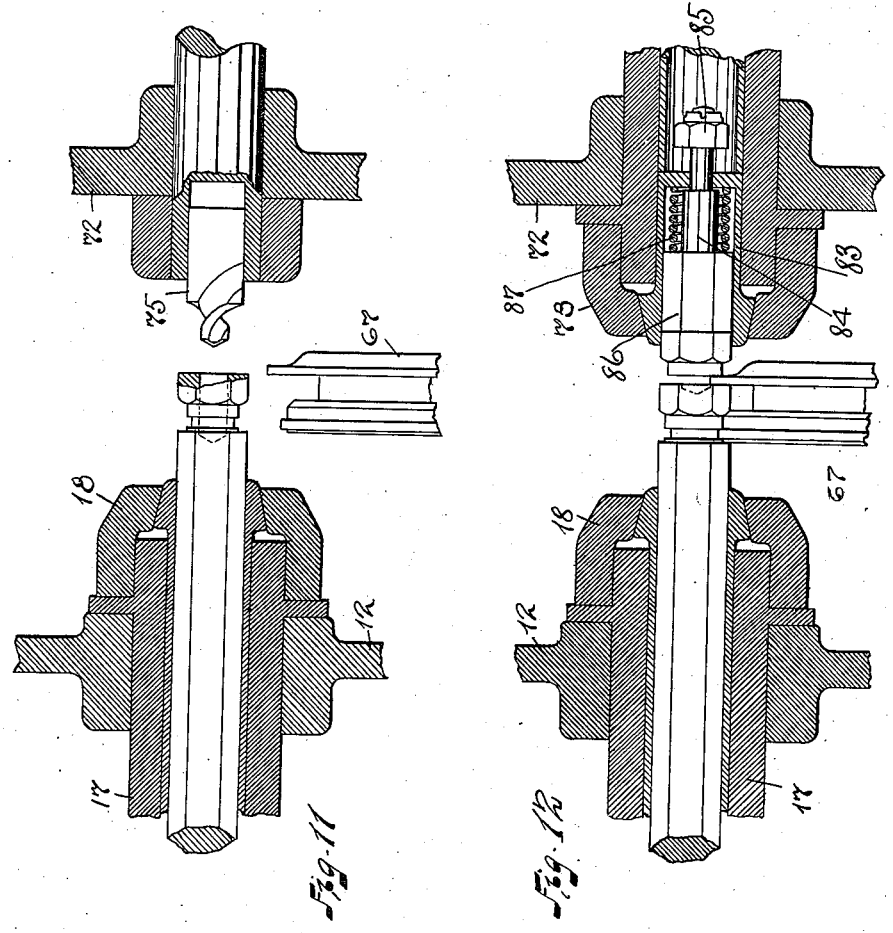

UNITED STATES PATENT OFFICE.

SYDNEY SMITH, OF DETROIT, MICHIGAN.

MACHINE FOR MAKING CASTELLATED NUTS.

1,216,742.   Specification of Letters Patent.   Patented Feb. 20, 1917.

Application filed May 7, 1914. Serial No. 836,923.

*To all whom it may concern:*

Be it known that I, SYDNEY SMITH, a citizen of the United States, and a resident of Detroit, county of Wayne, and State of Michigan, have invented a new and useful Improvement in Machines for Making Castellated Nuts, of which the following is a specification, the principle of the invention being herein explained and the best mode in which I have contemplated applying that principle, so as to distinguish it from other inventions.

The present invention relates to a metal working machine which has been designed for the purpose of forming in a single series of continuous operations a castellated nut from a suitable bar of stock. The machine is wholly automatic in its action, the entire number of operations being performed successively upon a blank piece of stock, and the construction is such that the whole number of operations are performed by a small and extremely compact machine. In the present machine a nut is bored, rounded, cut from the bar of stock, and then slotted and tapped while being held in one of two stock receiving members (one being a turret, and the other a stationary head) which are provided upon the main frame of the machine. Compactness is secured by mounting all of the tools, chucks, etc., in the two turrets and by relaying the cut off nut blank from one turret to the other after the first operations have been performed upon it.

Castellated nuts are usually made from hexagonal stock and are provided with three intersecting slots in the collar or "castle" which is formed on the nut proper. As in the present machine the nut blank is transported from the stock spindle in the main head to the turret after being cut from the stock, it is necessary to receive the same in a suitable chuck, and means are provided for synchronizing the rotation of the main chuck or spindle with the rotation of the auxiliary or receiving chuck in the turret.

In addition to the synchronizing means, other means are provided for stopping the auxiliary chuck in a predetermined position in order that the slots which are thereafter formed in the nut will bisect the various sides of the nut accurately. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 2:
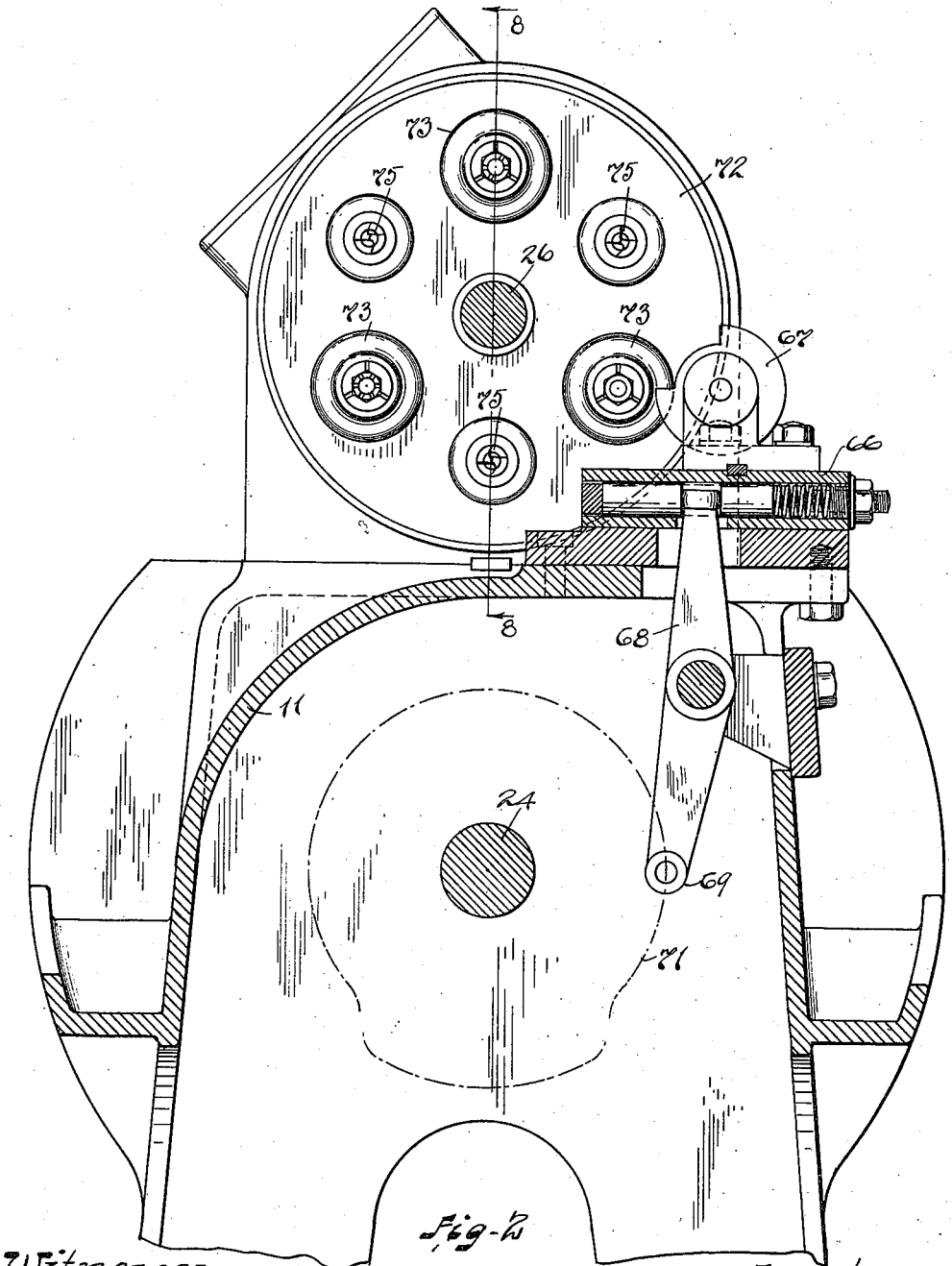
Figure 3:
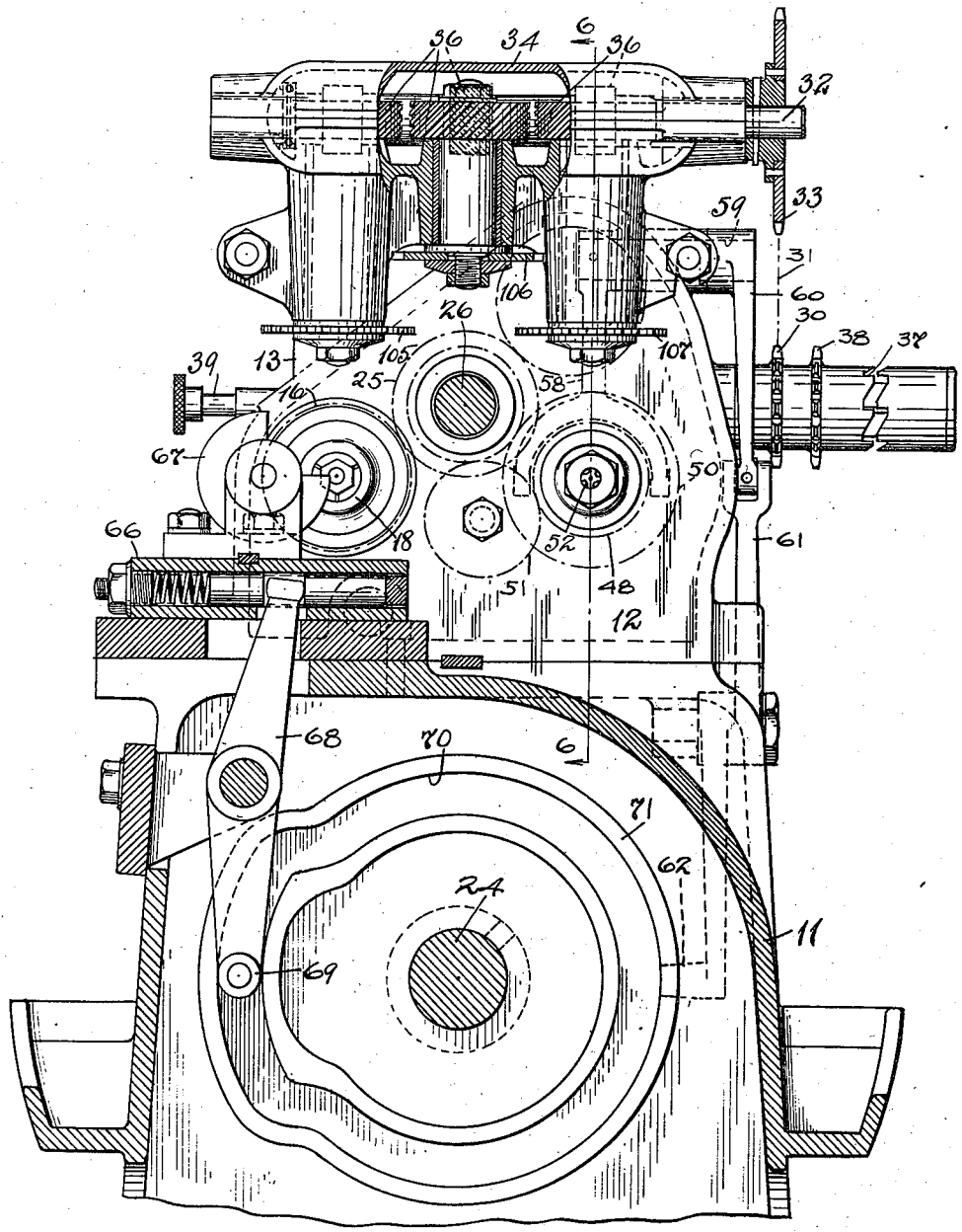
Figure 4:
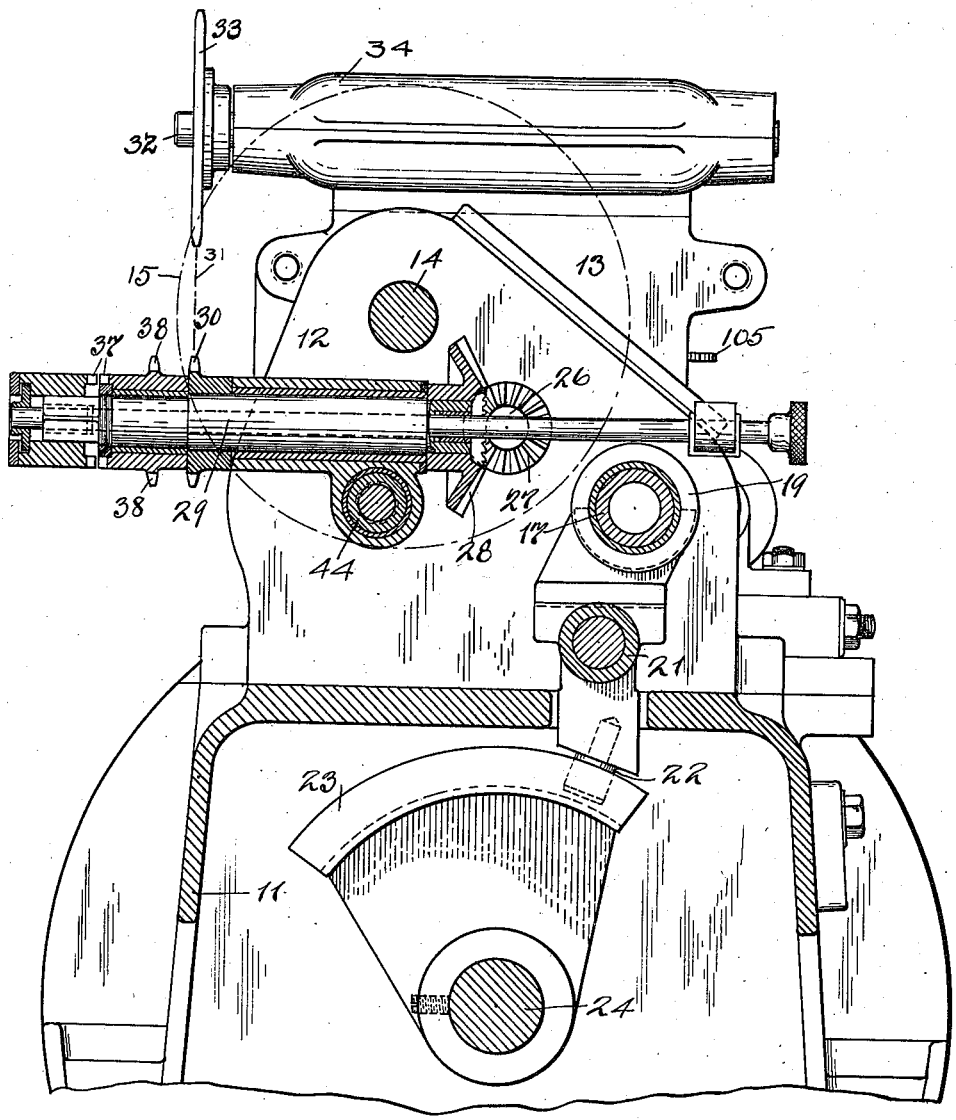

Figure 1 is a front side elevation of my machine; Fig. 2 is a section on the line 2—2, Fig. 1; Fig. 3 is a section on the line 3—3, Fig. 1; Fig. 4 is a section on the line 4—4, Fig. 1; Fig. 5 is a section on the line 5—5, Fig. 1; Fig. 6 is a section on the line 6—6, Fig. 3; Fig. 7 is a section on the line 7—7, Fig. 6; Fig. 8 is a central vertical section through the auxiliary head or turret, the line of section being indicated at 8—8, Fig. 2, with the rear plate omitted; Fig. 9 is a diagram indicating the sequence of operations in the machine; Fig. 10 is a perspective view of the clutch members used in the auxiliary head; and Figs. 11 and 12 are horizontal sections through the main spindle illustrating the construction and double operation of the forming and cutting off tool.

The mechanism which performs the above mentioned operations is suitably mounted upon a base or frame 11 which is provided with suitable oil reservoirs, oil conduits, and other similar means which are no part of the invention proper and hence need not be described. At the left side of the frame there is mounted the main head or stationary turret 12 provided at its upper end with a lateral extension 13 in which are mounted the saws and the shafts for driving the same. In this main head is also mounted the main driving shaft 14 which is provided externally of the head with a suitable pulley 15 for operation. Driven by suitable gears 16 and 25 (see Fig. 3) from this main driving shaft is a work-receiving spindle 17 provided with a suitable chuck 18, this spindle being parallel with the main driving shaft and extending through the head at either end, its rear end being provided with the operating means for the chuck, such means consisting of the familiar type of cone-shaped collar 19 adapted to spread a plurality of parallel pivoted fingers 20. The cone-shaped collar is attached to a longitudinally movable slide 21 provided with a friction roller 22 received in a cam 23 which is keyed to a cam shaft 24 mounted longitudinally in the frame 11.

The spindle 17 is driven from the main driving shaft 14 as stated, through gears 16 and 25, of which gear 25 is attached to an intermediate shaft 26 which extends rearwardly of the main head, being provided at that point with a bevel gear 27 engaging a second and complementary bevel gear 28 attached to a transverse shaft 29. Mounted upon this transverse shaft 29 is a sprocket 30 which drives through the medium of a suitable chain 31, a larger sprocket 33 attached to a shaft 32 rotatably mounted in the housing 34 for the saws (to be described later) and adapted to drive the same through suitable spiral gears 36. By means of a jaw clutch 37 a second sprocket 38 on the transverse shaft 29 can be attached to the same, the operation of the clutch 37 being controlled by the longitudinally movable handle or rod 39 this second sprocket 38 driving when engaged, a larger sprocket 40 attached to a second transverse shaft 41 which is provided with a worm 42 engaging a large gear 43 mounted exteriorly of the frame 11 and attached to the main cam shaft 24.

It will be understood, of course, that other driving means than those described may be used if desired, the particular arrangement and construction of the same being a matter of relative unimportance, the present arrangement being preferred merely by reason of its compactness and simplicity. A fourth longitudinally disposed shaft 44 is mounted in the main head 12, this shaft corresponding in horizontal position to the spindle 17 and being on the other side of the intermediate shaft and driven therefrom. Slidably but non-rotatably mounted upon this shaft are two connected one-way jaw clutch members 45 and 46 oppositely disposed and adapted to be engaged, either with another complementary clutch member 47 attached to a suitable gear 48 which is rotatably mounted on the shaft 44, or with a fourth jaw clutch member 49 attached to a second gear 50 also rotatably mounted on this shaft. Engagement with the left-hand (Fig. 6) or forward gear 50 by the clutch member 46 drives this clutch and shaft 44 in a forward direction, while engagement of the clutch members 47 and 45 causes the shaft 44 to be driven in a reverse direction since an intermediate gear 51 is provided which drives the gear attached to the clutch member 47. This shaft 44 is adapted to receive a tapping member 52 for the purpose of threading the formed nut when engaged by it.

Operation of the clutches described in the preceding paragraph is secured by means of a pin 55 engaging in a slot 56 in a collar 57 to which the two clutch members 45 and 46 are secured, the pin being attached to a vertically disposed lever 58 which is connected at its upper end to a transversely and rotatably mounted stub shaft 59, this shaft being attached at its other end to a short lever 60 which is operated by a pivoted link 61 provided at its lower end with a friction roller 62 resting against and operated by a cam 63 attached to the main cam shaft 24. The operation of the cam 63 moves the link 61 which then engages or disengages the clutches on the tapping shaft 44. The timing of this cam will be referred to later when the operation of the mechanism as a whole is taken up.

The details of construction of the spindle 17 in the main head 12 are unimportant, it being sufficient to state that the spindle is rotatable and that the ordinary type of compression chuck operated by the collar already referred to is provided, a suitable bar of preferably hexagonal stock being received within the chuck and gripped by the same when desired. Slidably mounted upon the frame 11 in front of the main head 12 is a forming slide 66 carrying a combined forming and cutting off tool 67, the movement, or rather the reciprocation of this slide, being controlled by a lever 68 pivoted at its center and provided at the lower end with a roller 69 operated by a suitable cam 71 attached to the main cam shaft 24. The forming and cutting off tool is best shown in Figs. 11 and 12, from which it can be seen that the tool 67 laterally forms and simultaneously cuts off the end portion of the bar of stock, thus producing a nut blank. The forming operation is performed on the stock at the same time that the previously formed end is being cut off, as will be evident from the figures referred to above. This forming and cutting off operation occurs after the stock has been fed through the chuck 17 and the end held in an auxiliary spindle or chuck to be fully described hereinafter.

Opposite to the main head is a secondary or auxiliary head or turret 72 in which there are mounted a plurality of spindles 73 provided with chucks and a plurality of drills 75. It will be simplest to take up the construction and operation of a single drill and chuck, and the entire cycle of operations can then be referred to under the general description of the operation.

The auxiliary turret 72 is rotatably mounted about an axis parallel to but not alined with the main spindle 17. The drills 75 mounted in the turret 72 are parallel with the axis of the same and are mounted in a position adapting them to be alined with the bar of stock in the main chuck in certain position of the turret. The drill 75 is reciprocably mounted in the turret and is adapted to be reciprocated by means of an actuating plate or slide 76 reciprocably mounted upon the rear of the frame behind the turret, this plate consisting of a slide 77 proper, a vertically disposed plate or disk 78 upon the slide, and a second smaller disk 79 spaced from but parallel to the first named disk. The drill 75 and the spindle 73 are provided at the rearwardly extending ends with disks 80 adapted to be engaged by the plates or disks 78 and 79 on the actuating slide 76, as will be readily seen from Fig. 1. Upon the rotation of the turret 72 into a position where a drill 75 is alined with the stock the actuating plate 76 is then advanced, thus advancing the drill, the latter engaging the center of the bar of stock and drilling the same. It will be understood that the drills are not themselves rotatable, the stock being rotated during the drilling operation by means of the chuck 18 which is then closed gripping the stock, the spindle 17 being rotated from the driving shaft as already described. The forming slide 66 is advanced following the drilling operation, thus forming the collar or castle adjacent to the body on the nut proper upon the bar of stock and cutting off the drilled end. After drilling the stock a predetermined distance the actuating plate 76 operates to return the drill, thus disengaging the same from the bar.

The turret 72 is then revolved by a suitable mechanism until one of the auxiliary chucks or spindles 73 in the same is alined with the stock. The auxiliary spindle 73 referred to is mounted parallel with the axis of the turret and is slidable and rotatable therein. The chuck is, of course, the same distance from the center of the turret as is the drill, and is thus perfectly alined with the stock upon revolution of the turret. It will be noted that the turret 72 rotates about the intermediate driving shaft 26, the spindles 73 being driven thereby. The spindle 73 or chuck is of the well known type known as the compression chuck, similar to the main chuck and operated in the same manner, by means of a cone-shaped collar 81 and pivoted fingers 82. The means for operating the cone-shaped collar will be referred to later. In the forward end of the chuck there is mounted a transverse plate or partition 83 in which is slidably held a plunger 84 having a reduced diameter and an enlarged diameter, the reduced portion of the plunger being received in the aperture in the plate and being slidably held therein between the enlarged portion of the same and a nut 85 on the end of the smaller portion. The outer end of the enlarged portion of this plunger is provided with a plate 86, and between this plate and the partition 83 in the chuck there is mounted a coiled spring 87 adapted to normally force the plunger to its extreme outward position. It will be seen that if any material such as a bar of stock is forced into this chuck, thus compressing the spring and displacing the plunger, and the chuck then closed, then upon disengagement, or opening the chuck, the plunger 84 will operate to eject the work from the same with considerable force, depending of course upon the tension of the spring.

Rotatably mounted upon the spindle 73 is a gear 88 which engages a second gear 89 attached to the intermediate longitudinally disposed driving shaft 26 which is journaled in the main head and extends through the same entering the front of the turret at its center. It is about this shaft that the turret revolves as an axis, and hence in all positions of the turret the two gears last referred to will be maintained in accurate alinement. The gear on the spindle is thus always driven by the gear on the intermediate driving shaft. The right side of the gear 88 on the spindle 73 is provided with a plurality of one-way engaging jaws 90 forming a clutch member adapted to be engaged by a complementary one-way clutch member 91 attached to a collar 92 slidably but non-rotatably mounted upon the spindle. The other face of the collar 92 is similarly constructed with a plurality of engaging jaws 93 adapting the same to operatively engage a fixed complementary clutch member 94 attached to the rear end 95 of the turret. Thus depending upon the engagement of the clutch members on the collar the spindle 73 can either be rotated at the same speed as the main spindle 17 and from the same driving shaft, or it can be fixed against rotation in the turret 72, in which position it will revolve with the turret. The clutch or collar 92 is operated by means of a sector-shaped finger 96 slidably engaging in the slot in the collar, this finger being attached to a longitudinally disposed rod 97 in line with the intermediate driving shaft 26 in the turret. This rod is slidably mounted in a tube 98 attached to the rear of the turret, there being a suitable compression spring 99 in this tube adapted to maintain the rod normally in its forward or advanced position. Reciprocation of the rod operates the collar, thus engaging or disengaging the clutch members, and such action by the rod is secured by pivotally attaching its rear end to a lever 100 which is pivoted intermediate its ends to the frame 11. The lower end of this lever is provided with a friction stud 101 engaging a suitably formed slot 102 in a cam 103 attached to the main cam shaft 24.

Castellated nuts are usually formed from hexagonal stock, but this is not essential, and in fact any polygonal form of stock may be used. In the event that other than hexagonal stock is used, it will be necessary to change the clutches which are shown in the present construction to make them correspond in number of jaws and in the relative position of the same to the faces of the stock.

The next operation in the machine after the drilling and forming and the alinement of the spindle 73 with the spindle 17 involves a moving up of the alined auxiliary chuck 73 into such a position that it can slip over and grip a bar of stock held in the main chuck 17. Both chucks or spindles 17 and 73 are formed of course with a suitable number of faces adapted to coöperatively grip the stock which is being used, and it is necessary to synchronize the rotation of the two chucks so that, as the auxiliary chuck 73 is advanced, it will be rotating in a position adapting it to smoothly slip over the bar of stock. In the present illustration I have shown hexagonal stock, hexagonal chucks, and consequently six-jaw clutches, each jaw being tapered on one side, thus making it a one-way clutch. Each jaw is positioned to correspond to one of the six gripping faces of the chuck. The jaws formed upon the gear 88 driven from the intermediate shaft 26 are permanently in position to correspond to the gripping faces of the chuck 73. Therefore, however the chuck is engaged, it will first rotate into such a position, by reason of the tapered faces on the jaws, that the auxiliary spindle, when thus picked up, is being rotated in synchronism with the main spindle. The changes which will be necessary in case other forms of stock are used will thus be readily seen, and need not be described at greater length.

Upon the rotation of the turret 72 into the position in which the auxiliary chuck 73 is alined with the stock, the chuck 73 is advanced, the chuck then slipping over the end of the bar of stock. The main chuck 17 is then disengaged from the stock permitting the latter to be slidable therethrough, and the auxiliary chuck 73 is simultaneously operated to close over and to grip the stock. The auxiliary chuck is then returned to its normal position by means of the second spaced disk 79 on the actuating plate or slide 76, thus drawing the stock through the main chuck 17 a given distance, this operation serving as a feed for the bar of stock. Upon thus being fed through the main chuck the latter is again closed gripping the bar, and the forming slide 66 is then moved forward thus cutting off the portion of the stock which is held in the auxiliary chuck 73. Only a slight movement of the forming slide is necessary for this operation, as it will be remembered that the end of the stock is already cored out by the drill in the former operation.

The end portion of the stock which is thus cut off forms a nut blank, and the turret is then revolved until another tool member is in line with the stock. There are three auxiliary chucks mounted at circumferentially equal intervals around the center of the turret, and between these three auxiliary chucks are mounted three drills also at equal intervals, each drill being half way between the chucks on either side. The turret is rotated six times to a revolution, each partial revolution being through an angle of 60 degrees, thus bringing the next tool member in line with the stock.

The three saws 105, 106 and 107, which are mounted in the main head 12, are disposed 60 degrees apart, figuring these spaces from the intermediate shaft in the main head as a center. The first saw is disposed 60 degrees from the main spindle 17. Upon the return of the auxiliary chuck 73, after the cutting off operation, it is restrained from rotation by the disengagement of the clutch in the gear 88 and by engagement of the other clutch with the fixed clutch member 94 in the turret. Thus the first 60 degrees of rotation of the turret brings the nut blank held in the auxiliary spindle 73 into alinement with the first of the three saws 105. The fixed clutch member is so disposed in the turret that it will stop the chuck in such a position that the 60 degree movement of the turret will bring the nut blank into a position where the saw 105 will bisect one of the faces of the blank upon advanced movement of the spindle. Upon moving through this first 60 degrees the turret 72 is stopped and the spindle 73 is again advanced, thus causing the nut to be slotted by the saw 105. Upon being slotted the spindle is returned to its normal position and the turret is then moved through another 60 degrees, thus bringing the nut blank into alinement with the center of the next saw 106. The spindle 73 is again advanced and returned, thus producing the second slot in the collar on the nut, and since the nut cannot turn with respect to the turret, the 60 degree movement of the turret will cause this second slot to bisect another of the faces of the nut. Another 60 degree movement of the turret 72, followed by a reciprocation of the spindle 73, produces the last slot in the nut by the saw 107. The three slots thus formed intersect each other at their center and each is at right angles to two opposite faces of the nut.

The turret is then moved through another 60 degrees, thus bringing the nut blank in the spindle in line with the tapping shaft 44 which is disposed 60 degrees from the last of the three saws 107. Advancement of the auxiliary spindle 73 then brings the nut into engagement with the tap 52, the latter being rotated by engagement of the clutch member previously described in a forward or advancing position. As the auxiliary spindle 73 reaches its farthest advanced position the cam 63 controlling the engagement of the tapping clutch operates to stop the forward rotation of the same and to engage the reversing clutch. Operation of this reversing clutch tends to draw the tapping member 52 away from the nut. The tapping member cannot of course be drawn out of the nut since it is threaded into the same, but this action by the tapping shaft draws the auxiliary spindle into its forward limiting position, there being a certain degree of lost motion between the two spaced disks 78 and 79 on the actuating plate 76, as will be readily seen from Fig. 1. The tap 52 is then rotated reversely and backs out of the nut as the latter is drawn away upon the return of the spindle 73.

The turret 72 is then rotated through another 60 degrees, thus making 300 degrees rotation from its position when the main and auxiliary spindles 17 and 73 were in line. At this point the auxiliary clutch in the auxiliary spindle is released, thus permitting the spring plunger 84 to eject the nut into a suitable conduit leading to a box or other suitable receiver for the finished nuts.

Another 60 degree movement of the turret brings the auxiliary spindle 73 into its original position opposite the main spindle, and the foregoing series of operations is then repeated. It will be understood that each drill 75 upon being alined with the stock, and upon advancement of the tools in the turret 72, bores out the end of the bar of stock while each spindle 73, upon being alined with and advanced toward the main spindle, grips and draws back the stock. In the meantime the forming and cutting operations have been performed by the forming slide. Thus each auxiliary chuck holds a nut, and upon a complete revolution of the turret one nut is completely finished, the second nut has just received its last slot from the saw 107, while the last of the three nuts is receiving its first slot from the first of the three saws 105. Thus three nuts are being formed simultaneously, certain of the forming tools, such as the drill, being held in the turret, others of the tools being held in the main head, as the saws, and the remainder of the tools being operated from the side by means of the forming slide.

It will be understood that any suitable timing mechanism may be employed for securing the foregoing cycle of operation, and the means which will now be described may be changed if desired, and in some cases will preferably be changed in case the operations which are to be performed are altered.

The rotation of the turret 72 is secured by means of an indexing cam 110 which is provided with two oppositely disposed radially extending rods 111 to each of which is attached a lateral friction stud 112 adapted to engage in radial slots 113 in a suitable plate 114 concentrically attached to the rear face of the turret 72. This indexing cam 110 is attached to the main cam shaft 24 and forms, together with the plate 114 attached to the turret, a Geneva stop. The plate 114 attached to the turret is provided with six of the radially disposed slots 113 adapted to receive the studs 112, and with six curved portions 116 adapted to be slidably contacted by the circular portion of the indexing cam, thus maintaining the turret against any possible rotation or wabbling between the times that the slots 113 are engaged by the studs 112 which produces rotation of the turret through 60 degrees.

Attached to the indexing cam 110 is an auxiliary chuck-operating cam 117 consisting of a bracket or lug 118 which is provided with a tapered face 119 adapted to contact a friction stud or roller 120 attached to a segmental arm or finger 121 which is slidably carried by means of two rods 122 reciprocably mounted in the actuating slide 76. This segmental arm 121 is moved into the slot on the cone collar 81 on each auxiliary spindle 73 as the latter is moved into the ejecting position. Upon being moved into this ejecting position the bracket 118 on the indexing cam 110 engages the friction roller 120 and reciprocates the segment 121, thus releasing the auxiliary chuck 73. The chuck is thus in its released position when the turret is moved through the next 60 degrees bringing this chuck into alinement with the stock.

The chuck 73 is closed by the action of a second lug 115 having a beveled face which engages the stud 120 and returns it to normal position, thus moving the segment 121 and closing the chuck. The precise timing of these opening and closing movements of the chuck will be as stated.

The actuating slide 76 is provided with a stud 123 engaging in a slot on the surface of a cylindrical cam 124 attached to the main cam shaft 24. It will be noticed that the main plate or disk 78 on the slide 76 is provided with adjustable pins 125 which engage the disks 80 on the ends of the drills 75 and spindles 73 in the turret 72. Thus any desired advance of these members is secured by proper adjustment of the pins 125 which are held in such adjusted position by means of lock nuts 126.

In Fig. 9 I illustrate diagrammatically the sequence of operations each circle representing one complete revolution of one cam, the operations produced by such cam being marked on the circle and their duration indicated by the black lines terminating in arrows. This diagram has been laid out on the assumption of a complete cycle of all operations (production of one nut) in eighteen seconds, but it will be evident that the time involved is unimportant, provided the relative timing of the operations is continued as in this cycle. It will also be evident that in case octagonal, square or other shaped nuts are to be produced, then the relative timing of the operations will be changed to conform to the modified structure, although any desired form may be produced by slightly modified forms of my improved apparatus.

The foregoing description has been presented in what is thought to be the clearest manner but it may be well at its conclusion to make a few remarks by way of summary. All cams are attached to or driven by the main cam shaft 24 disposed in the base 11 and driven in any suitable manner from the main driving shaft. The tools in the rotating turret are all advanced following each partial rotation of the turret, and the other tools (such as auxiliary spindle, forming slide and tap) are timed to operate upon the stock as held or engaged by the tools in the auxiliary turret. The saws are continuously rotated.

From the foregoing description it will be seen that the machine is extremely compact in construction, a number of operations being performed upon a bar of stock without taking up as much floor space as is usually required by machines performing an equal number of operations. This feature is of considerable practical importance and is secured by the present method of distributing the tool members between two oppositely disposed and relatively small sized turrets, the stock then being transferred from one turret to the other in time to be operated upon by the various tools carried in these turrets. The synchronizing clutches make this transferring of the stock from one chuck to another possible, and also provide means for stopping the stock in a predetermined position in the second turret for the purpose of securing the proper disposition of the slots in the faces of the formed nut. By referring, in the foregoing description, to the use of the present machine for making castellated nuts, the invention is not limited to this particular use, as various adaptations of the new construction which is here shown will readily suggest themselves to experts in the various branches of the metal working arts.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the character described, the combination with a rotatable chuck adapted to grip a bar of stock during a forming operation and means for releasing said chuck; of a second chuck adapted to be moved toward and from the first named chuck and to grip the formed end of the bar and feed the bar through said first named chuck.

2. In a machine of the character described, the combination with a rotatable chuck adapted to grip a bar of stock during a forming operation and means for releasing said chuck; of a second chuck alined with said first-named member and adapted to be moved toward and from the first-named chuck and to grip the formed end of the bar and feed the bar through the first named chuck.

3. In a machine of the character described, the combination with a rotatable chuck adapted to grip a bar of stock during a forming operation and means for releasing said chuck; of a second chuck alined with said first-named chuck and adapted to be moved toward and from the first-named chuck and to grip the formed end of the bar and feed the bar through said first named chuck; and means adapted to operate said second chuck.

4. In a machine of the character described, the combination with a rotatable chuck adapted to grip a bar of stock during a forming operation and means for releasing said chuck; of a second chuck alined with said first-named chuck and adapted to be moved toward and from the first-named chuck and to grip the formed end of the bar and feed the bar through the first named chuck, said second chuck being normally spaced from the bar; and means adapted to advance said second chuck toward the bar and operate the same.

5. In a machine of the character described, the combination with a rotatable chuck adapted to detachably engage a bar of stock during a forming operation and means for releasing the chuck; of a second chuck alined with said first-named chuck and adapted to be moved toward and from the first named chuck and to detachably engage the formed end of the bar of stock and feed the bar of stock through the first named chuck; and means adapted to advance said second chuck toward the bar of stock and to operate the same.

6. In a machine of the character described, the combination with a rotatable chuck adapted to grip a bar of stock during a forming operation; a rotatably mounted spindle; and means attached to said spindle and adapted to engage a bar of stock during a forming operation; of a second spindle alined with said first-named spindle and slidably mounted, said second spindle being normally spaced from the end of the bar of stock; means attached to said second spindle and adapted to engage and grip the formed end of the bar of stock and feed the bar of stock through its engaging means on the first-named spindle; and means adapted to move said second spindle toward and from said first-named spindle.

7. In a machine of the character described, the combination with a rotatable chuck adapted to grip a bar of stock during a forming operation; a rotatably mounted spindle; and means attached to said spindle and adapted to engage a bar of stock during a forming operation; of a second spindle alined with said first-named spindle and slidably mounted, said second spindle being normally spaced from the end of the bar of stock; means attached to said second spindle and adapted to engage the end of the bar of stock; means adapted to advance said second spindle toward said first-named spindle; means adapted to cause said means attached to said first-named spindle to release the stock upon forward advance of said second spindle; and means adapted to simultaneously cause said means on said second spindle to grip the stock, thereby drawing the latter through said first-named means upon return of said second spindle.

8. In a machine of the character described, the combination with a rotatable chuck adapted to grip a bar of stock during a forming operation; a rotatably mounted spindle; and means attached to said spindle and adapted to engage a bar of stock during a forming operation; of a second spindle alined with said first-named spindle and slidably mounted, said second spindle being normally spaced from the end of the bar of stock; means attached to said second spindle and adapted to engage the end of the bar of stock; means adapted to advance said second spindle toward said first-named spindle; means adapted to cause said means attached to said first-named spindle to release the stock upon forward advance of said second spindle; means adapted to simultaneously cause said means on said second spindle to grip the stock, thereby drawing the latter through said first-named means upon return of said second spindle; and means adapted to thereupon cause said first-named means to again grip the stock.

9. In a machine of the character described, the combination with a rotatable chuck adapted to grip a bar of stock during a forming operation; a rotatably mounted spindle, and a chuck attached to said spindle and adapted to engage a bar of stock during a forming operation; of a rotatably mounted second spindle alined with said first-named spindle and slidably mounted, said second spindle being normally spaced from the end of the bar of stock; a second chuck attached to said second spindle and adapted to engage the end of the bar of stock; means adapted to advance said second spindle toward said first-named spindle; means adapted to cause said chuck attached to said first-named spindle to release the stock upon forward advance of said second spindle; means adapted to simultaneously cause said chuck on said second spindle to grip the stock, thereby drawing the latter through said first-named spindle; means adapted to thereupon cause said first-named chuck to again grip the stock; and driving means adapted to rotate said two spindles in unison.

10. In a machine of the character described, the combination with a rotatably mounted chuck member adapted to detachably grip a bar of stock; of a second rotatably and slidably mounted chuck member alined with said first-named chuck; cam means adapted to advance said second chuck toward said first-named chuck and to return the same; means adapted to cause said first-named chuck to release the bar of stock and to simultaneously cause said second chuck to grip the same upon advance movement of the latter, thereby drawing the bar through said first-named means upon return of said second chuck; and means adapted to rotate said two chucks in unison.

11. In a machine of the character described, the combination with a rotatably mounted chuck member adapted to detachably grip a bar of stock; of a second rotatably and slidably mounted chuck member alined with said first-named chuck; cam means adapted to advance said second chuck toward said first-named chuck and to return the same; means adapted to cause said first-named chuck to release the bar of stock and to simultaneously cause said second chuck to grip the same upon advance movement of the latter, thereby drawing the bar through said first-named means upon return of said second chuck, said cam means being also adapted to cause said first-named chuck to reëngage the bar of stock upon the return of said second chuck; and means adapted to rotate said two chucks in unison.

12. In a machine of the character described, the combination with a rotatably mounted chuck adapted to grip a polygonal bar of stock; a second rotatably mounted chuck also adapted to grip the polygonal bar; and means adapted to be moved toward the first named chuck to rotate said two chucks in synchronism to thereby permit the engagement of the second chuck with the bar of stock in the first named chuck during the rotation of the chucks.

13. In a machine of the character described, the combination with a rotatably mounted chuck adapted to grip a polygonal bar of stock; a second rotatably mounted chuck adapted to engage and grip the polygonal bar; means adapted to rotate said two chucks in synchronism; and means adapted to move said second chuck toward and from the first named chuck, whereby the second chuck is permitted to grip the polygonal bar during the rotation of the chucks.

14. In a machine of the character described, the combination with a rotatably mounted chuck adapted to grip a polygonal bar of stock; a second rotatably mounted chuck alined with and adapted to be moved toward and from said first-named chuck but normally spaced therefrom, said second chuck being adapted, when advanced, to extend over and grip the polygonal bar; means adapted to rotate said two chucks in synchronism, whereby the second chuck is permitted to grip the polygonal bar during the rotation of the chucks.

15. In a machine of the character described, the combination of a rotatably mounted chuck adapted to detachably grip a polygonal bar of stock; a second rotatably mounted chuck adapted to be advanced toward the first named chuck to grip the polygonal bar, said second chuck being alined with, but normally spaced from said first-named chuck; means adapted to rotate said chucks in synchronism, whereby the second chuck is permitted to grip the polygonal bar during the rotation of the chucks.

16. In a machine of the character described, the combination of a rotatably mounted chuck adapted to detachably grip a polygonal bar of stock; a second rotatably mounted chuck adapted to be moved toward the first named chuck to grip the polygonal bar, said second chuck being alined with but normally spaced from said first-named chuck; means adapted to rotate said chucks in synchronism; and means adapted to cause said second chuck to grip the polygonal bar during the rotation of the chucks.

17. In a machine of the character described, the combination of a rotatably mounted chuck having a number of faces adapted coöperatively to detachably grip a suitably shaped polygonal bar; a second rotatably mounted chuck having a plurality of faces adapted to extend over and detachably grip such polygonal bar; and means adapted to rotate said two chucks in synchronism.

18. In a machine of the character described, the combination of a rotatably mounted chuck having a number of faces adapted coöperatively to detachably grip a suitably shaped polygonal bar; a second rotatably mounted chuck having a plurality of faces adapted also to extend over and detachably grip such polygonal bar; means adapted to rotate said first-named chuck; and other means adapted to rotate said second chuck in synchronism with said first-named chuck.

19. In a machine of the character described, the combination of a rotatably mounted chuck having a number of faces adapted coöperatively to detachably grip a suitably shaped polygonal bar; a second rotatably mounted chuck having the same number of faces and arranged in the same manner as in said first-named chuck and adapted also to extend over and detachably grip such polygonal bar; means adapted to rotate said first-named chuck and said second chuck at equal speeds in the same direction; and other means adapted to cause the rotation of said two chucks to be in synchronism.

20. In a machine of the character described, the combination of a rotatably mounted chuck having a number of faces adapted coöperatively to detachably grip a suitably shaped polygonal bar; a second rotatably mounted chuck having the same number of faces and arranged in the same manner as in said first-named chuck and adapted also to extend over and detachably grip such polygonal bar, means adapted to rotate said first-named chuck; a gear rotatably mounted on said second chuck; means adapted to rotate said gear at the same speed as said first-named chuck; and means adapted to connect said gear to said second chuck in position to rotate the latter in synchronism with said first-named chuck.

21. In a machine of the character described, the combination of a rotatably mounted chuck having a number of faces adapted coöperatively to detachably grip a suitably shaped polygonal bar; a second rotatably mounted chuck having the same number of faces and arranged in the same manner as in said first-named chuck and adapted also to extend over and detachably grip said polygonal bar; means adapted to rotate said first-named chuck; a gear rotatably mounted on said second chuck; means adapted to rotate said gear at the same speed as said first-named chuck; a clutch member attached to said gear, said member having spaced engaging jaws equal in number and similar in arrangement to the gripping faces on said chucks; a second complementary clutch member slidably but non-rotatably mounted on said second chuck; and controlling means adapted to engage said clutch members, thereby causing said chucks to be rotated in synchronism.

22. In a machine of the character described, the combination of a rotatably mounted chuck having a number of faces adapted coöperatively to detachably grip a suitably shaped polygonal bar; a second rotatably mounted chuck having the same number of faces and arranged in the same manner as in said first-named chuck and adapted also to extend over and detachably grip said polygonal bar; means adapted to rotate said first-named chuck; a gear rotatably mounted on said second chuck; means adapted to rotate said gear at the same speed as said first-named chuck; a clutch member attached to said gear, said member having spaced engaging jaws equal in number and similar in arrangement to the gripping faces on said chucks; a second complementary clutch member slidably but non-rotatably mounted on said second chuck; means adapted to engage said clutch members; and means adapted to then advance said second chuck, thereby sliding the gripping faces of the same over the polygonal bar.

23. In a machine of the character described, the combination of a rotatably mounted chuck having a number of faces adapted coöperatively to detachably grip a suitably shaped polygonal bar; a second rotatably mounted chuck having the same number of faces and arranged in the same manner as in said first-named chuck and adapted also to extend over and detachably grip said polygonal bar; means adapted to rotate said first-named chuck; a gear rotatably mounted on said second chuck; means adapted to rotate said gear at the same speed as said first-named chuck; a clutch member attached to said gear, said member having spaced engaging jaws equal in number and similar in arrangement to the gripping faces on said chucks; a second complementary clutch member slidably but non-rotatably mounted on said second chuck; means adapted to engage said clutch members; reciprocating means adapted to then advance said second chuck, thereby sliding the gripping faces of the same over the polygonal bar; and means adapted to thereupon cause said first-named chuck to release the bar.

24. In a machine of the character described, the combination of a rotatably mounted chuck having a number of faces adapted coöperatively to detachably grip a suitably shaped polygonal bar; a second rotatably mounted chuck having the same number of faces and arranged in the same manner as in said first-named chuck and adapted also to extend over and detachably grip said polygonal bar; means adapted to rotate said first-named chuck; a gear rotatably mounted on said second chuck; means adapted to rotate said gear at the same speed as said first-named chuck; a clutch member attached to said gear, said member having spaced engaging jaws equal in number and similar in arrangement to the gripping faces on said chucks; a second complementary clutch member slidably but non-rotatably mounted on said second chuck; means adapted to engage said clutch members; reciprocating means adapted to then advance said second chuck, thereby sliding the gripping faces of the same over the polygonal bar; releasing means adapted to thereupon cause said first-named chuck to release the bar; and other means adapted to cause said second chuck to grip the bar.

25. In a machine of the character described, the combination of a rotatably mounted chuck having a number of faces adapted coöperatively to detachably grip a suitably shaped polygonal bar; a second rotatably mounted chuck having the same number of faces and arranged in the same manner as in said first-named chuck and adapted also to extend over and detachably grip said polygonal bar; means adapted to rotate said first-named chuck; a gear rotatably mounted on said second chuck; means adapted to rotate said gear at the same speed as said first-named chuck; a clutch member attached to said gear, said member having spaced engaging jaws equal in number and similar in arrangement to the gripping faces on said chucks; a second complementary clutch member slidably but non-rotatably mounted on said second chuck; means adapted to engage said clutch members; reciprocating means adapted to then advance said second chuck, thereby sliding the gripping faces of the same over the polygonal bar; releasing means adapted to thereupon cause said first-named chuck to release the bar; and other means adapted to cause said second chuck to grip the bar; said reciprocating means being adapted to then return said second chuck, thereby drawing the bar with it.

26. In a machine of the character described, the combination of a rotatably mounted chuck having a number of faces adapted coöperatively to detachably grip a suitably shaped polygonal bar; a second rotatably mounted chuck having the same number of faces and arranged in the same manner as in said first-named chuck and adapted also to extend over and detachably grip said polygonal bar; means adapted to rotate said first-named chuck; a gear rotatably mounted on said second chuck; means adapted to rotate said gear at the same speed as said first-named chuck; a clutch member attached to said gear, said member having spaced engaging jaws equal in number and similar in arrangement to the gripping faces on said chucks; a second complementary clutch member slidably but non-rotatably mounted on said second chuck; means adapted to engage said clutch members; reciprocating means adapted to then advance said second chuck, thereby sliding the gripping faces of the same over the polygonal bar; releasing means adapted to thereupon cause said first-named chuck to release the bar; other means adapted to cause said second chuck to grip the bar; said reciprocating means being adapted to then return said second chuck, thereby drawing the bar with it; and said releasing means being adapted to cause said first-named chuck to again grip the bar; said reciprocating means being adapted to then return said second chuck, thereby drawing the bar with it; and cutting means adapted to be advanced to cut from the bar the portion gripped by said second chuck.

27. In a machine of the character described, the combination of a rotatably mounted chuck having a number of faces adapted coöperatively to detachably grip a suitably shaped polygonal bar; a second rotatably mounted chuck having the same number of faces and arranged in the same manner as in said first-named chuck and adapted also to extend over and detachably grip said polygonal bar; means adapted to rotate said first-named chuck; a gear rotatably mounted on said second chuck; means adapted to rotate said gear at the same speed as said first-named chuck; a clutch member attached to said gear, said member having spaced engaging jaws equal in number and similar in arrangement to the gripping faces on said chucks; a second complementary clutch member slidably but non-rotatably mounted on said second chuck; means adapted to engage said clutch members; reciprocating means adapted to then advance said second chuck, thereby sliding the gripping faces of the same over the polygonal bar; releasing means adapted to thereupon cause said first-named chuck to release the bar; other means adapted to cause said second chuck to grip the bar; said reciprocating means being adapted to then return said second chuck, thereby drawing the bar with it; and said releasing means being adapted to cause said first-named chuck to again grip the bar; said reciprocating means being adapted to then return said second chuck, thereby drawing the bar with it; cutting means adapted to be advanced to cut from the bar the portion gripped by said second chuck; said controlling means being adapted to then disengage said clutch members; and means adapted to stop said second chuck in a predetermined relative position.

28. In a machine of the character described, the combination of a rotatably mounted chuck having a number of faces adapted coöperatively to detachably grip a suitably shaped polygonal bar; a second rotatably mounted chuck having the same number of faces and arranged in the same manner as in said first-named chuck and adapted also to extend over and detachably grip said polygonal bar; means adapted to rotate said first-named chuck; a gear rotatably mounted on said second chuck; means adapted to rotate said gear at the same speed as said first-named chuck; a clutch member attached to said gear, said member having spaced engaging jaws equal in number and similar in arrangement to the gripping faces on said chucks; a second complementary clutch member slidably but non-rotatably mounted on said second chuck; means adapted to engage said clutch members; reciprocating means adapted to then advance said second chuck, thereby sliding the gripping faces of the same over the polygonal bar; releasing means adapted to thereupon cause said first-named chuck to release the bar; other means adapted to cause said second chuck to grip the bar; said reciprocating means being adapted to then return said second chuck, thereby drawing the bar with it; and said releasing means being adapted to cause said first-named chuck to again grip the bar; said reciprocating means being adapted to then return said second chuck, thereby drawing the bar with it; cutting means adapted to be advanced to cut from the bar the portion gripped by said second chuck; said controlling means being adapted to then disengage said clutch members; and means adapted to stop said second chuck in a predetermined relative position, said means including a third jaw clutch member attached to said complementary clutch member and a fixed complementary member adapted to be engaged by said third clutch member upon disengagement of said two first-mentioned clutch members.

29. In a machine of the character described, the combination of a rotatably mounted chuck having six similar gripping faces forming a hexagon and adapted to detachably grip a hexagonal bar of stock; a second rotatably mounted hexagonal chuck alined with, but normally spaced from, said first-named chuck and adapted to be advanced toward the first named chuck to detachably grip the hexagonal bar of stock held therein; and means adapted to rotate said two chucks in synchronism to permit the engagement of the second chuck with the bar of stock during the rotation of the chucks.

30. In a machine of the character described, the combination of a rotatably mounted chuck having six similar gripping faces forming a hexagon and adapted to detachably grip a hexagonal bar of stock; a second rotatably mounted hexagonal chuck alined with, but normally spaced from, said first-named chuck and adapted to detachably grip the hexagonal bar of stock; means adapted to rotate said first-named chuck; other means adapted to rotate said second chuck; and means adapted to cause the rotation of said two chucks to be in synchronism.

31. In a machine of the character described, the combination of a rotatably mounted chuck having six similar gripping faces forming a hexagon and adapted to detachably grip a hexagonal bar of stock; a second rotatably mounted hexagonal chuck alined with, but normally spaced from, said first-named chuck and adapted to detachably grip the hexagonal bar of stock; means adapted to rotate said first-named chuck; a gear rotatably mounted on said second chuck and driven at the same speed as said first-named chuck; and means adapted to attach said gear to said second chuck and to cause the resulting rotation of the same to be in synchronism with the rotation of said first-named chuck.

32. In a machine of the character described, the combination of a rotatably mounted chuck having six similar gripping faces forming a hexagon and adapted to detachably grip a hexagonal bar of stock; a second rotatably mounted hexagonal chuck alined with, but normally spaced from, said first-named chuck and adapted to detachably grip the hexagonal bar of stock; means adapted to rotate said first-named chuck; a gear rotatably mounted on said second chuck and driven at the same speed as said first-named chuck; and means adapted to attach said gear to said second chuck and to cause the resulting rotation of the same to be in synchronism with the rotation of said first-named chuck, said means including a six jaw clutch member attached to said gear and a similar complementary clutch member attached to said second chuck.

33. In a machine of the character described, the combination of a rotatably mounted chuck having six similar gripping faces forming a hexagon and adapted to detachably grip a hexagonal bar of stock; a second rotatably mounted hexagonal chuck alined with, but normally spaced from, said first-named chuck and adapted to detachably grip the hexagonal bar of stock; means adapted to rotate said first-named chuck; a gear rotatably mounted on said second chuck and driven at the same speed as said first-named chuck; and means adapted to attach said gear to said second chuck and to cause the resulting rotation of the same to be in synchronism with the rotation of said first-named chuck, said means including a six jaw clutch member attached to said gear and a similar complementary clutch member attached to said second chuck; and means adapted to stop said second chuck in a predetermined relative position.

34. In a machine of the character described, the combination of a rotatably mounted chuck having six similar gripping faces forming a hexagon and adapted to detachably grip a hexagonal bar of stock; a second rotatably mounted hexagonal chuck alined with, but normally spaced from, said first-named chuck and adapted to detachably grip the hexagonal bar of stock; means adapted to rotate said first-named chuck; a gear rotatably mounted on said second chuck and driven at the same speed as said first-named chuck; and means adapted to attach said gear to said second chuck and to cause the resulting rotation of the same to be in synchronism with the rotation of said first-named chuck, said means including a six jaw clutch member attached to said gear and a similar complementary clutch member attached to said second chuck; and means adapted to stop said second chuck in a predetermined relative position, said last-named means including a third six jaw clutch member attached to said second complementary clutch member and a fixed fourth six jaw clutch member adapted to be engaged by said third clutch member.

35. In a machine for making nuts, the combination with a suitable stock engaging chuck and means adapted to cut off a portion of the same; of a turret mounted about an axis parallel with but not alined with said chuck; a second chuck rotatably and slidably mounted in said turret in alinement with said first-named chuck; reciprocating means adapted to advance said second chuck into position to grip the stock and to then return said second chuck to normal position; and means adapted to simultaneously disengage said first-named chuck and to engage said second chuck.

36. In a machine for making nuts, the combination with a suitable stock engaging chuck and means adapted to cut off a portion of the same; of a turret mounted about an axis parallel with but not alined with said chuck; a second chuck rotatably and slidably mounted in said turret in alinement with said first-named chuck; reciprocating means adapted to advance said second chuck into position to grip the stock and to then return said second chuck to normal position; means adapted to simultaneously disengage said first-named chuck and to engage said second chuck; and means adapted to rotate said two chucks during such operations.

37. In a machine for making nuts, the combination with a suitable stock engaging chuck and means adapted to cut off a portion of the same; of a turret mounted about an axis parallel with but not alined with said chuck; a second chuck rotatably and slidably mounted in said turret in alinement with said first-named chuck; reciprocating means adapted to advance said second chuck into position to grip the stock and to then return said second chuck to normal position; means adapted to simultaneously disengage said first-named chuck and to engage said second chuck; means adapted to rotate said two chucks during such operation; and driving means adapted to rotate said turret.

38. In a machine for making nuts, the combination with a suitable stock engaging chuck and means adapted to cut off a portion of the same; of a turret rotatably mounted about an axis parallel with but not alined with said chuck; gripping means in said turret adapted to grip the portion of the stock to be cut off and feed the stock through the first named chuck to the cutting off means; a tapping member rotatably mounted parallel to said chuck; and means and the cut off portion of the stock therein adapted to rotate said turret until said gripping means are alined with said tapping member.

39. In a machine for making nuts, the combination with a suitable stock engaging chuck and means adapted to cut off a portion of the same; of a turret rotatably mounted about an axis parallel with but not alined with said chuck; gripping means in said turret adapted to grip the portion of the stock to be cut off and feed the stock through the first named chuck to the cutting off means; a tapping member rotatably mounted parallel to said chuck; means adapted to rotate said tapping member; a clutch adapted to connect said means and said member; and means adapted to rotate said turret until said gripping means and the cut off portion of the stock are alined with said tapping member.

40. In a machine for making castellated nuts, the combination of a chuck adapted to detachably grip a polygonal bar of stock; a turret rotatably mounted about an axis parallel with but not alined with said chuck; a drill mounted in said turret and adapted to be alined with the stock in said chuck; gripping means also mounted in said turret and adapted to be alined with the stock; reciprocating means adapted to advance and return said drill, thereby hollowing out the end of the stock; and means adapted to rotate said turret until said gripping means are alined with the stock.

41. In a machine for making castellated nuts, the combination of a chuck adapted to detachably grip a polygonal bar of stock; a turret rotatably mounted about an axis parallel with but not alined with said chuck; a drill mounted in said turret and adapted to be alined with the stock in said chuck; reciprocating means adapted to advance and return said drill thereby hollowing out the end of the stock; a second chuck slidably and rotatably mounted in said turret and adapted to be alined with the stock; means adapted to rotate said turret until said second chuck is alined with the stock; said reciprocating means then advancing and returning said second chuck.

42. In a machine for making castellated nuts, the combination of a chuck adapted to detachably grip a polygonal bar of stock; a turret rotatably mounted about an axis parallel with but not alined with said chuck; a drill mounted in said turret and adapted to be alined with the stock in said chuck; reciprocating means adapted to advance and return said drill thereby hollowing out the end of the stock; a second chuck slidably and rotatably mounted in said turret and adapted to be alined with the stock; means adapted to rotate said turret until said second chuck is alined with the stock; said reciprocating means then advancing and returning said second chuck; and engaging means adapted to cause said second chuck to grip the stock when in advanced position.

43. In a machine for making castellated nuts, the combination of a chuck adapted to detachably grip a polygonal bar of stock; a turret rotatably mounted about an axis parallel with but not alined with said chuck; a drill mounted in said turret and adapted to be alined with the stock in said chuck; reciprocating means adapted to advance and return said drill thereby hollowing out the end of the stock; a second chuck slidably and rotatably mounted in said turret and adapted to be alined with the stock; means adapted to rotate said turret until said second chuck is alined with the stock; said reciprocating means then advancing and returning said second chuck; engaging means adapted to cause said second chuck to grip the stock when in advanced position; and means adapted to cause said first-named chuck to simultaneously release the stock.

44. In a machine for making castellated nuts, the combination of a chuck adapted to detachably grip a polygonal bar of stock; a turret rotatably mounted about an axis parallel with but not alined with said chuck; a drill mounted in said turret and adapted to be alined with the stock in said chuck; reciprocating means adapted to advance and return said drill thereby hollowing out the end of the stock; a second chuck slidably and rotatably mounted in said turret and adapted to be alined with the stock; means adapted to rotate said turret until said second chuck is alined with the stock; said reciprocating means then advancing and returning said second chuck; engaging means adapted to cause said second chuck to grip the stock when in advanced position; means adapted to cause said first-named chuck to simultaneously release the stock; and driving means adapted to rotate said chucks in synchronism.

45. In a machine for making castellated nuts, the combination of a chuck adapted to detachably grip a polygonal bar of stock; a turret rotatably mounted about an axis parallel with but not alined with said chuck; a drill mounted in said turret and adapted to be alined with the stock in said chuck; reciprocating means adapted to advance and return said drill thereby hollowing out the end of the stock; a second chuck slidably and rotatably mounted in said turret and adapted to be alined with the stock; means adapted to rotate said turret until said second chuck is alined with the stock; said reciprocating means then advancing and returning said second chuck; engaging means adapted to cause said second chuck to grip the stock when in advanced position; means adapted to cause said first-named chuck to simultaneously release the stock; said last-named means causing said first-named chuck to again grip the stock upon the return of said second chuck; and driving means adapted to rotate said chucks in synchronism.

46. In a machine for making castellated nuts, the combination of a chuck adapted to detachably grip a polygonal bar of stock; a turret rotatably mounted about an axis parallel with but not alined with said chuck; a drill mounted in said turret and adapted to be alined with the stock in said chuck; reciprocating means adapted to advance and return said drill thereby hollowing out the end of the stock; a second chuck slidably and rotatably mounted in said turret and adapted to be alined with the stock; means adapted to rotate said turret until said second chuck is alined with the stock; said reciprocating means then advancing and returning said second chuck; engaging means adapted to cause said second chuck to grip the stock when in advanced position; means adapted to cause said first-named chuck to simultaneously release the stock; said last-named means causing said first-named chuck to again grip the stock upon the return of said second chuck; driving means adapted to rotate said chucks in synchronism; and cutting means adapted to cut off the hollowed out end portion of the stock held by said second chuck.

47. In a machine for making castellated nuts, the combination of a chuck adapted to detachably grip a polygonal bar of stock; a turret rotatably mounted about an axis parallel with but not alined with said chuck; a drill mounted in said turret and adapted to be alined with the stock in said chuck; gripping means also mounted in said turret and adapted to be alined with the stock; reciprocating means adapted to advance and return said drill, thereby hollowing out the end of the stock; a second chuck slidably and rotatably mounted in said turret and adapted to be alined with the stock; reciprocating means adapted to advance and return said drill and said second chuck; driving means adapted to rotate said two chucks; means adapted to synchronize the rotation of said two chucks whereby said second chuck is permitted to slip over and grip the bar of stock upon being advanced.

48. In a machine for making castellated nuts, the combination of a chuck adapted to detachably grip a polygonal bar of stock; a turret rotatably mounted about an axis parallel with but not alined with said chuck; a drill mounted in said turret and adapted to be alined with the stock in said chuck; gripping means also mounted in said turret and adapted to be alined with the stock; reciprocating means adapted to advance and return said drill, thereby hollowing out the end of the stock; a second chuck slidably and rotatably mounted in said turret and adapted to be alined with the stock, said second chuck being adapted in proper position to slip over and grip the end of the bar of stock; reciprocating means adapted to advance and return said drill and said second chuck; driving means adapted to rotate said two chucks; and means adapted to synchronize the rotation of the same.

49. In a machine for making castellated nuts, the combination of a chuck adapted to detachably grip a polygonal bar of stock; a turret rotatably mounted about an axis parallel with but not alined with said chuck; a drill mounted in said turret in position to be alined with said chuck in one position of said turret; a second chuck slidably and rotatably mounted in said turret and adapted to be alined with said first-named chuck in a second position of said turret, said second chuck being similar in its stock gripping faces to said first-named chuck; driving means adapted to rotate said two chucks; reciprocating means adapted to advance and return said drill and said second chuck, thereby hollowing out the end of the bar when said drill is alined therewith; means adapted to then rotate said turret into the second position, whereupon said second chuck is advanced; and means adapted to cause the rotation of said two chucks to be in synchronism.

50. In a machine for making castellated nuts, the combination of a chuck adapted to detachably grip a polygonal bar of stock; a turret rotatably mounted about an axis parallel with but not alined with said chuck; a drill mounted in said turret in position to be alined with said chuck in one position of said turret; a second chuck slidably and rotatably mounted in said turret and adapted to be alined with said first-named chuck in a second position of said turret, said second chuck being similar in its stock gripping faces to said first-named chuck; driving means adapted to rotate said two chucks; reciprocating means adapted to advance and return said drill and said second chuck, thereby hollowing out the end of the bar when said drill is alined therewith; means adapted to then rotate said turret into the second position, whereupon said second chuck is advanced; controlling means including a polygonal clutch adapted to grip said second chuck and cause the rotation of the same to be in synchronism with the rotation of said first-named chuck; and means adapted to simultaneously release said first-named chuck and operate said second chuck upon the advance of the latter.

51. In a machine for making castellated nuts, the combination of a chuck adapted to detachably grip a polygonal bar of stock; a turret rotatably mounted about an axis parallel with but not alined with said chuck; a drill mounted in said turret in position to be alined with said chuck in one position of said turret; a second chuck slidably and rotatably mounted in said turret and adapted to be alined with said first-named chuck in a second position of said turret, said second chuck being similar in its stock gripping faces to said first-named chuck; driving means adapted to rotate said two chucks; reciprocating means adapted to advance and return said drill and said second chuck, thereby hollowing out the end of the bar when said drill is alined therewith; means adapted to then rotate said turret into the second position, whereupon said second chuck is advanced; controlling means including a polygonal clutch adapted to grip said second chuck and cause the rotation of the same to be in synchronism with the rotation of said first-named chuck; means adapted to simultaneously release said first-named clutch and operate said second chuck upon the advance of the latter; and means adapted to again operate said first-named chuck upon return of said second chuck; and cutting means adapted to thereupon cut off the hollowed out end portion of the stock held by said second chuck.

52. In a machine for making castellated hexagonal nuts, the combination of a chuck adapted to detachably grip a hexagonal bar of stock; a turret rotatably mounted about an axis parallel to said chuck; three drills mounted in said turret concentrically about the axis of the same and spaced 120° apart; three other chucks slidably and rotatably mounted in said turret, said chucks being spaced 120° apart and being mounted symmetrically between said drills; means adapted to intermittently rotate said turret through 60°, thereby alternately bringing one of said drills and then one of said chucks into operative alinement with said stock in said first-named chuck; and reciprocating means for advancing and returning said drills and said chucks during the momentary stationary positioning of said turret, whereby the bar of stock is alternately hollowed out by one of said drills and then engaged by one of said chucks.

53. In a machine for making castellated hexagonal nuts, the combination of a chuck adapted to detachably grip a hexagonal bar of stock; a turret rotatably mounted about an axis parallel to said chuck; three drills mounted in said turret concentrically about the axis of the same and spaced 120° apart; three other chucks slidably and rotatably mounted in said turret, said chucks being spaced 120° apart and being mounted symmetrically between said drills; means adapted to intermittently rotate said turret through 60°, thereby alternately bringing one of said drills and then one of said chucks into operative alinement with said stock in said first-named chuck; reciprocating means for advancing and returning said drills and said chucks during the momentary stationary positioning of said turret; and suitable forming means adapted to operate upon the bar of stock simultaneously with one of said drills.

54. In a machine for making castellated hexagonal nuts, the combination of a chuck adapted to detachably grip a hexagonal bar of stock; a turret rotatably mounted about an axis parallel to said chuck; three drills mounted in said turret concentrically about the axis of the same and spaced 120° apart; three other chucks slidably and rotatably mounted in said turret; said chucks being spaced 120° apart and being mounted symmetrically between said drills; means adapted to intermittently rotate said turret through 60°, thereby alternately bringing one of said drills and then one of said chucks into operative alinement with said stock in said first-named chuck; reciprocating means for advancing and returning said drills and said chucks during the momentary stationary positioning of said turret; and suitable forming means adapted to form a shoulder upon the bar of stock adjacent to the end of the same during the drilling operation.

55. In a machine for making castellated hexagonal nuts, the combination of a chuck adapted to detachably grip a hexagonal bar of stock; a turret rotatably mounted about an axis parallel to said chuck; three drills mounted in said turret concentrically about the axis of the same and spaced 120° apart; three other chucks slidably and rotatably mounted in said turret, said chucks being spaced 120° apart and being mounted symmetrically between said drills; means adapted to intermittently rotate said turret through 60°, thereby alternately bringing one of said drills and then one of said chucks into operative alinement with said stock in said first-named chuck; reciprocating means for advancing and returning said drills and said chucks during the momentary stationary positioning of said turret; controlling means adapted to synchronize the rotation of said chucks in said turret and said first-named chuck upon alinement of the same; and other means adapted to simultaneously release said first-named chuck and operate the alined one of said other chucks upon advance movement of the same, whereby the bar of stock is fed through said first-named chuck upon return movement of such alined chuck.

56. In a machine for making castellated hexagonal nuts, the combination of a chuck adapted to detachably grip a hexagonal bar of stock; a turret rotatably mounted about an axis parallel to said chuck; three drills mounted in said turret concentrically about the axis of the same and spaced 120° apart; three other chucks slidably and rotatably mounted in said turret, said chucks being spaced 120° apart and being mounted symmetrically between said drills; means adapted to intermittently rotate said turret through 60°, thereby alternately bringing one of said drills and then one of said chucks into operative alinement with said stock in said first-named chuck; reciprocating means for advancing and returning said drills and said chucks during the momentary stationary positioning of said turret; controlling means adapted to synchronize the rotation of said chucks in said turret and said first-named chuck upon alinement of the same; and other means adapted to simultaneously release said first named chuck and operate the alined one of said other chucks upon advance movement of the same, whereby the bar of stock is fed through said first-named chuck upon return movement of such alined chuck, said other means being adapted to thereupon cause said first-named chuck to again grip the bar of stock.

57. In a machine for making castellated hexagonal nuts, the combination of a chuck adapted to detachably grip a hexagonal bar of stock; a turret rotatably mounted about an axis parallel to said chuck; three drills mounted in said turret concentrically about the axis of the same and spaced 120° apart; three other chucks slidably and rotatably mounted in said turret, said chucks being spaced 120° apart and being mounted symmetrically between said drills; means adapted to intermittently rotate said turret through 60°, thereby alternately bringing one of said drills and then one of said chucks into operative alinement with said stock in said first-named chuck; reciprocating means for advancing and returning said drills and said chucks during the momentary stationary positioning of said turret; controlling means adapted to synchronize the rotation of said chucks in said turret and said first named chuck upon alinement of the same; other means adapted to simultaneously release said first-named chuck and operate the alined one of said other chucks upon advance movement of the same, whereby the bar of stock is fed through said first-named chuck upon return movement of such alined chuck, said other means being adapted to thereupon cause said first-named chuck to again grip the bar of stock; and suitable cutting means adapted to cut off the hollowed end portion of the stock held by such alined chuck.

58. In a machine for making castellated hexagonal nuts, the combination of a chuck adapted to detachably grip a hexagonal bar of stock; a turret rotatably mounted about an axis parallel to said chuck; three drills mounted in said turret concentrically about the axis of the same and spaced 120° apart; three other chucks slidably and rotatably mounted in said turret, said chucks being spaced 120° apart and being mounted symmetrically between said drills; means adapted to intermittently rotate said turret through 60°, thereby alternately bringing one of said drills and then one of said chucks into operative alinement with said stock in said first-named chuck; reciprocating means for advancing and returning said drills and said chucks during the momentary stationary positioning of said turret; suitable forming means adapted to form a shoulder upon the bar of stock adjacent to the end of the same during the drilling operation; controlling means adapted to synchronize rotation of said chucks in said turret and said first-named chuck upon alinement of the same; other means adapted to simultaneously release said first-named chuck and operate the alined one of said other chucks upon advance movement of the same, said other means being also adapted to again operate said first-named chuck upon return movement of such alined chuck, and said forming means being adapted to cut off the hollowed out, shouldered end portion of the bar held in such alined chuck.

59. In a machine for making castellated hexagonal nuts, the combination of a chuck adapted to detachably grip a hexagonal bar of stock; a turret rotatably mounted about an axis parallel to said chuck, three drills mounted in said turret concentrically about the axis of the same and spaced 120° apart; three other chucks slidably and rotatably mounted in said turret, said chucks being spaced 120° apart and being mounted symmetrically between said drills: means adapted to intermittently rotate said turret through 60° thereby alternately bringing one of said drills and then one of said chucks into operative alinement with said stock in said first-named chuck; reciprocating means for advancing and returning said drills and said chucks during the momentary stationary positioning of said turret; suitable forming means adapted to form a shoulder upon the bar of stock adjacent to the end of the same during the drilling operation; controlling means adapted to synchronize rotation of said chucks in said turret and said first-named chuck upon alinement of the same; other means adapted to simultaneously release said first-named chuck and operate the alined one of said other chucks upon advance movement of the same, said other means being also adapted to again operate said first-named chuck upon return movement of such alined chuck, and said forming means being adapted to cut off the hollowed out, shouldered end portion of the bar held in such alined chuck, said turret being adapted to then rotate through 60°, bringing the next one of said drills in line with the stock.

60. In a machine for making castellated hexagonal nuts, the combination of a chuck adapted to detachably grip a hexagonal bar of stock; a turret rotatably mounted about an axis parallel to said chuck, three drills mounted in said turret concentrically about the axis of the same and spaced 120° apart; three other chucks slidably and rotatably mounted in said turret, said chucks being spaced 120° apart and being mounted symmetrically between said drills; means adapted to intermittently rotate said turret through 60°, thereby alternately bringing one of said drills and then one of said chucks into operative alinement with said stock in said first-named chuck; reciprocating means for advancing and returning said drills and said chucks during the momentary stationary positioning of said turret; suitable forming means adapted to form a shoulder upon the bar of stock adjacent to the end of the same during the drilling operation; controlling means adapted to synchronize rotation of said chucks in said turret and said first-named chuck upon alinement of the same; other means adapted to simultaneously release said first-named chuck and operate the alined one of said other chucks upon advance movement of the same, said other means being also adapted to again operate said first-named chuck upon return movement of such alined chuck, and said forming means being adapted to cut off the hollowed out, shouldered end portion of the bar held in such alined chuck, said turret being adapted to then rotate through 60°, bringing the next one of said drills in line with the stock; a rotatable saw mounted opposite said turret in position to engage the nut blank in said chuck in the new position of the same upon advancement of said chuck.

61. The combination with two polygonal chucks having an equal number of similarly disposed engaging faces; of means adapted to synchronously rotate said chucks, said means including a clutch member driven by the rotating means and having a plurality of engaging jaws equal in number and similar in relative position to such faces on said chucks.

62. The combination with two polygonal chucks having an equal number of similarly disposed engaging faces; of means adapted to synchronously rotate said chucks, said means including a clutch member driven by the rotating means and having a plurality of engaging jaws equal in number and similar in relative position to such faces on said chucks, and a second and similar clutch member attached to one of said chucks and adapted to engage such first-named clutch member.

63. The combination with two hexagonal chucks and means adapted to rotate one of the same; of a clutch member non-rotatably connected to the other of said chucks and provided with six spaced equal jaws corresponding in position to the six faces of said chuck; a similar and complementary clutch member adapted to engage with said first-named clutch member; and a gear attached to said complementary clutch member and driven at the same speed and in the same direction as the other of said chucks.

64. The combination with two hexagonal chucks and means adapted to rotate one of the same; of a clutch member non-rotatably connected to the other of said chucks and provided with six spaced equal jaws corresponding in position to the six faces of said chuck; a similar and complementary clutch member adapted to engage with said first-named clutch member; a third similar clutch member attached to first-named clutch member; a fixed complementary clutch member adapted to be engaged by said third member; a gear attached to said first-named complementary clutch member and driven at the same speed and in the same direction as the other of said chucks; and means adapted to engage said two attached clutch members with either said clutch member attached to said gear or said fixed clutch member.

65. In a compression chuck, the combination of a disk, a rod attached thereto, a spring encircling said rod and contacting against said disk, a transverse plate in said chuck provided with an aperture receiving said rod, said spring also contacting said plate, and a limiting nut on said rod adapted to contact said plate.

66. In a machine of the character described, the combination with a chuck adapted to grip a bar of stock; a turret rotatably mounted about an axis parallel to said chuck; a plurality of elements mounted in said turret at circumferentially spaced points; of a cam plate concentrically attached to the rear of said turret, said plate having a radial engaging surface corresponding to each of said elements; a driving shaft mounted parallel to the axis of said turret; and an operating pin eccentrically connected to said shaft and adapted upon each revolution of the same to contact one of such engaging faces on said plate and rotate said turret through part of a revolution.

67. In a machine of the character described, the combination of a rotatably mounted turret; a plurality of tool members slidably mounted in said turret parallel to the axis of the same, said members extending through the rear end of said turret and having their extending ends in substantial alinement; a slidably mounted actuating plate adapted to contact the extending ends of said members and to advance and return the same; and cam means adapted to operate said actuating plate.

68. In a machine of the character described, the combination of a rotatably mounted turret; a plurality of tool members slidably mounted in said turret parallel to the axis of the same, said members extending through the rear end of said turret and having their extending ends in substantial alinement; disks attached to the alined ends of said members; a slidably mounted actuating plate provided with two spaced disks adapted, upon movement of said plate in either direction, to contact said disks on said members and move the latter; and cam means adapted to operate said actuating plate.

69. In a machine of the character described, the combination of a rotatably mounted turret; a plurality of tool members slidably mounted in said turret parallel to the axis of the same, said members extending through the rear end of said turret and having their extending ends in substantial alinement; disks attached to the alined ends of said members; a slidably mounted actuating plate provided with two spaced disks adapted, upon movement of said plate in either direction, to contact said disks on said members and move the latter; and cam means adapted to operate said actuating plate, said two disks on said plate being so spaced as to constitute a lost motion connection between said actuating plate and said members; and cam means adapted to operate said actuating plate.

70. In a machine of the character described, the combination of a rotatably mounted turret; a plurality of tool members slidably mounted in said turret parallel to the axis of the same, said members extending through the rear end of said turret and having their extending ends in substantial alinement; disks attached to the alined ends of said members; an actuating plate provided with two spaced disks, one being disposed on either side of said disks on said alined members; contacting pins adjustably mounted in one of said disks in said plate, whereby the tuning of the movement of said members may be changed; and cam means adapted to operate said actuating member.

71. In a machine of the character described, the combination of a rotatably mounted turret; a plurality of tool members slidably mounted in said turret parallel to the axis of the same, said members extending through the rear end of said turret and having their extending ends in substantial alinement; disks attached to the alined ends of said members; an actuating plate provided with two spaced disks, one being disposed on either side of said disks on said alined members; contacting pins adjustably mounted in one of said disks in said plate, whereby the tuning of the movement of said members may be changed; a driving shaft mounted parallel to said plate; a cylindrical cam mounted on said shaft; and a stud attached to said plate and engaged by said cam.

72. In a machine of the character described, the combination of a turret rotatably mounted; a chuck slidably and rotatably mounted in said turret parallel to the axis of the same and extending the rear end of said turret; an actuating plate slidably mounted behind said turret and adapted to advance and return said chuck upon movement; a rod mounted in said plate, said rod being in line with the axis of said turret and extending into the same; means adapted to rotate said chuck, said means being operable by said rod; and cam means adapted to move said plate and to operate said rod.

73. In a machine of the character described, the combination of a turret rotatably mounted; a chuck slidably and rotatably mounted in said turret parallel to the axis of the same and extending the rear end of said turret; an actuating plate slidably mounted behind said turret and adapted to advance and return said chuck upon movement; a rod mounted in said plate, said rod being in line with the axis of said turret and extending into the same; means adapted to rotate said chuck, said means being operable by said rod; and cam means adapted to move said plate, thereby advancing said chuck and to operate said rod to cause rotation of said chuck and to engage said chuck.

74. In a machine of the character described, the combination of a turret rotatably mounted; a chuck slidably and rotatably mounted in said turret parallel to the axis of the same and extending the rear end of said turret; an actuating plate slidably mounted behind said turret and adapted to advance and return said chuck upon movement; a rod mounted in said plate, said rod being in line with the axis of said turret and extending into the same; means adapted to rotate said chuck, said means being operable by said rod; cam means adapted to move said plate to advance said chuck; means connected to said rod and adapted to rotate said chuck and means adapted to engage said chuck, said means being operative in only one position of said turret.

75. In a machine of the character described, the combination of a turret rotatably mounted; a chuck slidably and rotatably mounted in said turret parallel to the axis of the same and extending the rear end of said turret; an actuating plate slidably mounted behind said turret and adapted to advance and return said chuck upon movement; a rod mounted in said plate, said rod being in line with the axis of said turret and extending into the same; means adapted to rotate said chuck, said means being operable by said rod; cam means adapted to move said plate to advance said chuck; a rotatable member; a clutch adapted to connect said member to said chuck; a sector-shaped finger engaging said clutch in one position of said turret, said finger being connected to and operable by said rod; means adapted to operate said rod; and means adapted to engage said chuck.

76. In a machine of the character described, the combination of a rotatably mounted turret; a compression chuck slidably mounted in said turret; an operating collar provided with a slot and attached to said chuck, said collar being adapted to engage and disengage said chuck upon relative movement between said collar and said chuck; means adapted to advance said chuck; and a plate adapted in one position of said turret to engage in such slot in said collar thereby causing operation of said chuck.

77. In a machine of the character described, the combination of a rotatably mounted turret; a chuck mounted in said turret and adapted to receive a piece of stock; a tapping member rotatably mounted in position to be alined with the stock in said chuck; means adapted to rotate said tapping member in one direction, to then momentarily cease such rotation and to then rotate said member in the opposite direction; and lost-motion means adapted to first advance said chuck, then release the same and then return the same to normal position.

78. In a machine of the character described, the combination of a rotatable chuck adapted to grip a bar of stock; a second chuck movable toward and from said first named chuck to grip such bar of stock and feed it through the first named chuck; and means for actuating said first-named chuck to release such stock, and substantially simultaneously actuating said last-named chuck to grip the same upon the return movement of the last named chuck.

79. In a machine of the character described, the combination of two alined chucks, each adapted to engage a bar of stock, one of said chucks being rotatable and the other movable into a position adapting it to grip the bar of stock held in said rotatable chuck, and means adapted, when said chucks are in such relation, to actuate the first-named to release such stock and to simultaneously actuate the last-named to grip the same whereby the bar of stock may be fed through said rotatable chuck by the return movement of the other chuck.

80. In a machine of the character described, the combination of two alined chucks, each adapted to engage a bar of stock, said chucks being relatively movable into a position adapting both to engage the same bar of stock, means adapted to release the chuck holding the bar upon such relative movement and to simultaneously engage the other on such bar, said means being also adapted to maintain such release and permit the feed of the bar of stock through the stock holding chuck upon the return of said chucks to their normal spaced relation.

Signed by me this 2nd day of April, 1914.

SYDNEY SMITH.

Attested by—
JOHN L. AUSTIN,
L. C. MACGREGOR.